United States Patent Office 3,154,524
Patented Oct. 27, 1964

3,154,524
POLYAMIDES FROM COMPLEX POLYNUCLEAR
POLYCARBOXYLIC ACIDS
Thomas W. Martinek, Crystal Lake, Ill., assignor to
The Pure Oil Company, Chicago, Ill., a corporation of Ohio
No Drawing. Filed Dec. 30, 1960, Ser. No. 79,548
8 Claims. (Cl. 260—78)

This invention relates to polyamide resins and their method of preparation from a new source of complex polynuclear polycarboxylic acids and more particularly to a new class of polyamide resins useful in protective coatings, structural plastics and the like.

Various polyamide resins are described in the prior art including the large class of nylon-type resins prepared from dicarboxylic aliphatic acids. Although the methods of preparing these prior art resins may be used to prepare the resins of this invention, the end products differ markedly because of the nature of the complex di- and polycarboxylic polynuclear acids used as starting materials. In contradistinction to the complex starting acids of this invention, the prior art uses such acids as oxalic acid, oxamic acid, p,p'-diphenyl propane diacetic acid, bicyclo-(3,3,0)-octane-1,4-dicarboxylic acid, succinic acid, and dibenzoic acids among others. The acids used in this invention, as further described herein, are characterized by being derived from solvent extracts obtained in the solvent extraction of mineral lubricating oils by reaction of the solvent extracts with an alkali metal, carbonation and acidification. A complete description of the manner of preparing these complex polynuclear acids is presented in copending applications Serial Numbers 819,932, now abandoned, and 79,661.

It is accordingly an object of this invention to provide a new class of linear polyamides of high molecular weight derived from "extract dibasic acids," said polyamides having the following formula:

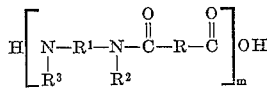

wherein $R^1$ embodies a divalent hydrocarbon radical with a chain length of at least 2 carbon atoms, i.e., $R^1$ may be alkyl, aryl, cycloparaffinic alkaryl or aralkyl in nature and contain up to 20 carbon atoms $R^2$ and $R^3$ are the same or different and may be hydrogen, alkyl, aryl, alkaryl, aralkyl or cycloparaffinic radicals containing from 1 to 20 carbon atoms R is the complex polynuclear, aromatic, alkyl-aromatic and/or heterocyclic (that is containing some heterocyclic rings of carbon, sulfur, and/or nitrogen and oxygen) nuclei derived from solvent extracts obtained in the solvent refining of mineral lubrication oils, and $m$ has a value greater than 1 up to 100.

Another object of this invention is to provide cross-linked or cyclic polymers, which cannot be represented by simple formulae as above, prepared from diamines or polyamines.

Another object of this invention is to provide a novel class of polyamide resins and which may be used in the manufacture of strong, elastic fibers, coatings and coating compositions.

Still another object is to provide polyamide resins having recurring units of the formula:

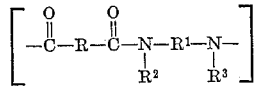

wherein R, $R^1$, $R^2$, and $R^3$ are as above defined, and further that $R^1$, $R^2$, and $R^3$ represent sites wherein cross-linking reaction may occur.

These and other objects will be apparent or be described as the specification proceeds.

The main objectives of this invention are attained by means of heating to a sufficient temperature a polyamine containing at least one hydrogen atom on each amino nitrogen atom and a complex mixture of polynuclear poly-aromatic di- and/or polycarboxylic acids obtained from solvent extracts. Polymers of differing molecular weight and physical properties may be attained by varying the relative concentrations of reactants time-temperature cycles, order of addition of reactants, etc., as is well known in this art.

Certain of the amines used in accordance with this invention have the formulae:

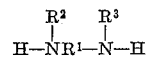

or

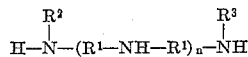

wherein $R^1$ embodies a divalent hydrocarbon radical with chain length of at least 2 carbon atoms, i.e., $R^1$ may be alkyl, aryl, cycloparaffinic, alkaryl, aralkyl or heterocyclic (i.e. contain oxygen, nitrogen or sulfur in the chain or rings), in nature and contain up to 30 carbon atoms. $R^2$ and $R^3$ may be the same or different substituents including hydrogen, alkyl, aryl, alkaryl or cycloparaffinic radicals containing from 1 to 20 carbon atoms. When $R^1$ contains nitrogen, the nitrogen may be present as either secondary or tertiary amine. The amines employed in this case may be diamines, $R^1$ is the radical $(CH_2)_x$ where $x$ is at least 2. Typical polymethylene di-amines include ethylenediamine, trimethylenediamine, tetramethylenediamine, pentamethylenediamine, hexamethylenediamine, heptamethylenediamine, octamethylenediamine, nonamethylenediamine, decamethylenediamine, etc. The di-primary amines such as 2-aminopropylamine, 2 - aminobutylamine, 2 - aminoamylamine, 2-aminohexylamine, 2-aminoheptylamine, 2-aminooctylamine, 2-aminononylamine, 2-aminodecylamine, 2- aminoundecylamine, 2-aminododecylamine, 2-aminotridecylamine, 2 - aminotetradecylamine, 2 - aminopentadecylamine, 2 - aminohexadecylamine, 2 - aminoheptadecylamine, 2-aminooctadecylamine, 2-aminononadecylamine and 2-aminoeicosylamine are other examples.

Still other examples include isobutylenediamine,
2,3-diaminobutane,
1,2-diaminopropane,
3-aminoamylamine,
1,2-butylenediamine,
N-methylethylenediamine,
3-aminohexylamine,
4-aminoheptylamine,
2-methyl-1,2-diaminobutane,
5-aminooctylamine,
N-monoethylethylenediamine,
2-methyl-1,4-diaminobutane,
2,2-dimethyl-1,3-propane diamine,
1-dimethylamino-2-aminopropane,
1-ethyl amino-2-aminobutane,
2-methyl-2-methylamino-1-aminobutane,
3-ethylamino-2-methyl-2-aminopropane,
6-aminononylamine,
7-aminodecylamine,
8-aminoundecylamine,
16-aminooctadecylamine,
ortho-, meta- and paratolidine,
ortho, meta, and paraphenylenediamine,
toluenediamine, sym-triaminobenzene,
o-aminobenzylamine,
m-aminobenzylamine,
2,4-diaminotoluene,
sym-triaminotoluene,
phenylethylenediamine,
m-xylylenediamine,
N-phenylaminoethylamine,
p-aminoethylaniline,
3.3'-diaminobiphenyl,
4,4'-diaminophenylmethane,
p,p'-bis-aminomethyldiphenylmethane,
4,4'-methylene-bis-aniline,
the hydroxy aromatic diamines etc.

Non-limiting examples of suitable di-secondary amines include

N,N'-dimethylethylenediamine,
N-methyl-2-aminopropylamine,
N,N'-dimethylphenylenediamine,
N-methyl-N'-butyl-p-tolidine,
N,N'-dibutylethylenediamine,
2-butylaminoaniline,
N,N'-diphenylphenylenediamine,
N,N'-di-isopropylphenylenediamine,
N,N'-dibutyphenylenediamine,
N,N'-diamylphenylenediamine,
N,N'-dihexylphenylenediamine,
N,-methyl-N'-phenyl-p-tolidine,
N-butyl-N'-isopropyl-p-tolidine,
N-amyl-N'-isobutyphenylenediamine, and
N,N'-dimethyl-2-aminopropylamine.

Diamines prepared by reacting ethylenimine with a long chain primary aliphatic amine at temperatures of from 150° to 225° C. may be used. Amines containing an alicyclic nucleus can be used as represented by trans-1,2-diaminocyclobutane,
1,3-diaminocyclohexane,
1,4-di-aminocyclohexane,
1,4-cyclohexanebis(methylamine),
1,3-cyclohexanebis(methyl amnie),
1,2-cyclohexanebis-(methyl amine),
2,5-norcamphane bis(methyl amine).

Diamines containing ether groups can be used as represented by 3,3'-oxybis(propyl amine),
bis-amino propoxyhexane,
3,7-dioxa-1,9-nonanediamine,
3,8-dioxa-1,10-decane diamine,
3,9-dioxa-1,11-undecanediamine, and
higher homologs, i.e.,
4,7,-dioxa-1,10-decanediamine,
5,8-dioxa-1,12-dodecanediamine,
4,8-dioxa-1,11-undecanediamine and
5,9-dioxa-1,13-tridecanediamine.

Diamines containing two oxygen hetero atoms in the chain which contains aromatics or hydroaromatic rings such as diphenylolpropane-di-beta-aminoethylether, 1,4-di-hydroxy-benzene-di-beta-aminoethylether may be used. Polyamines such as tetraethylene pentamine, tetraethylenetetramine, pentaethylenepentamine and pentaethylene tetramine may be used. Other functionally equivalent polyamines such as melamine, piperazine and the various substituted piperazines in which the nitrogen atoms are part of a heterocyclic molecular structure may also be utilized. The unsaturated polyamines such as, aminomethylalkylamine, 1,3-diamino pentene-4 and the polyfunctional amino alcohols such as hydroxy ethylaminoethylene diamine, hydroxypropylaminoethylene diamine and hydroxybutylaminoethylene diamine. Moreover, modified polyamides are also contemplated wherein the reactants include glycolamines, amino-alcohols, amino-carboxylic acids and other amino compounds including spremidin and spermin.

The preparation of the novel polyamide resins of this invention can be accomplished by any of the processes well known in the art, several of which are illustrated in the examples to follow. All of these processes involve the condensation of the complex extract dibasic acids in accordance with this invention and a polyfunctional amine. Many such amines and processes for their condensation with dicarboxylic acids are described in the prior art as illustrated by Carother's Patents 2,130,523 and 2,130,948.

It is obvious that the bifunctional or polyfunctional amines used as reactants may be replaced by various equivalent bi- and poly-functional amine compounds in any manner known in the art. Moreover, the process of preparing the polyamides of this invention, whether they be linear, or cross-linked polymers, resides basically in heating the two bifunctional or polyfunctional reactants until the product has polymerized to the resinous stage, which stage is not generally reached until the polyamide has an intrinsic viscosity of at least 0.1 and preferably above 0.4 to 0.6. Although various methods of accomplishing this condensation reaction are available, the most practical and useful method involves heating of the reactants with or without solvent using techniques well known in the art, including multistage processing.

Further, although the invention will be illustrated using single diamines or polyamines, it is to be understood that mixtures of various diamines, polyamines and mixed diamines and polyamines, may be used without departing from the invention and that order of addition may be varied. The use of a mixture of amines and/or varied order of addition for the reaction has utility in controlling, varying and augmenting the resinous properties of the polyamide product. For example, a small amount of a polyamine may be used to promote cross-linking of the diamine-polybasic extract acid amide product.

The di- and polycarboxylic acids from which the polyamides of this invention are prepared are obtained by metalation and carbonation of solvent extracts. Preferred methods are described in copending applications Serial Numbers 819,932 and 79,661, filed on June 12, 1959, and December 12, 1960, respectively. The processes of the copending applications are preferred because of the increased yields of extracts acids, their enhanced acid numbers, and the facility with which the reaction is carried out. These preferred processes are described in such detail as to enable one skilled in the art to proceed. The disclosures relative to the details of these processes from the aforesaid copending applications are hereby incorporated for reference.

The general procedure is to react about 30 parts of a petroleum fraction rich in complex polynuclear aromatics, as best exemplified by solvent extracts, with 1 to 5 parts of an alkali metal, i.e. sodium, potassium lithium, cesium or rubidium, and mixtures or amalgams thereof, at a temperature of about $-60°$ to 80° C. in the presence of a reaction solvent. The reaction solvent includes the "active ethers" dimethylglycolether, dimethylether, methylalkylethers, dialkylglycolethers, methylethylketone and other solvents such as tetrahydrofuran, and trimethylamine.

The first step of the reaction forms the alkali metal addition compound, known as an alkali metal adduct, which step is promoted by shearing of the alkali metal in the reaction mass, providing an excess of alkali metal surface by using a pre-formed dispersion of alkali metal in an inert liquid solvent or by pre-forming a dispersion of the alkali metal in a part or all of the solvent extract. These techniques, used in accordance with said copending applications, overcome the tendency of the impurities in the solvent extracts to coat or react with the alkali metal and inhibit the reaction or at least prevent adduct formation from beginning. A Brookfield counter-rotating stirrer is employed to give continuous shearing of the metal and promote the starting of the reaction. The adduct-oil solution, evidenced by its color, is next treated with carbon dioxide in gaseous or solid state, under carbonation conditions to form the alkali metal salt of complex polynuclear polycarboxylic acids having the reactable aromatic and/or heterocyclic nuclei from the solvent extracts as the organic portion of the molecule.

Example I

To illustrate, 100 g. of phenol extract, from the preparation of 170 vis., 100 VI neutral oil, dissolved in 675 cc. of dry tetrahydrofuran and agitated in a Brookfield stirrer at 10° to 30° C. was reacted with 8.3 g. of metallic sodium in the form of 3/16" cubes. Adduct formation appeared to begin after 25 minutes of contacting and thereafter a strong color change occurred. This adduct was cooled to −60° C. while an excess of carbon dioxide gas was introduced which discharged the color without any precipitation. 5.1 g. of unreacted sodium was removed, the tetrahydrofuran was vacuum-stripped and the remaining liquid was combined with ether and water-washed. Acidification of the aqueous phase and further ether-washing accomplished the recovery of the free acids. About 11% of the solvent extract had reacted. The acid product had an indicated average molecular weight of 686, a saponification value of 171 and a calculated equivalent weight of 328 indicating 2.1 acid groups per molecule.

Example II

In still another experiment, 100 g. of solvent extract and 675 ml. of dry tetrahydrofuran were charged to a one-liter, three-necked flask equipped with a stirrer, thermometer, pressure equalized drop-funnel, gas-inlet with rotometer, and gas-outlet. A dry nitrogen atmosphere was maintained. Approximately 100 g. of Alundum balls 5/16" in diameter were charged and agitation was started. The solution was cooled to −20° C. and 8.3 g. of sodium as a 20% dispersion in toluene were added. After 5 minutes, no reaction had occurred and the solution was allowed to warm. After 25 minutes, the temperature had risen to −7° C. and a few particles of sodium appeared to be reacting, i.e., the deep color of the complex was seen to be forming on the surface of a few particles when agitation was momentarily stopped. Within an additional 17 minutes, the reaction was proceeding smoothly to produce good yields of the sodium adduct which was treated with an excess of dry carbon dioxide atmosphere at −80° C. over a period of 78 minutes. The reaction mixture was worked up as in Example I after the excess sodium was destroyed by the addition of water. Hydrogen evolution from the remaining sodium indicated that only 48% of the sodium had reacted. Approximately 84.5% of the oil was recovered, indicating 15.5% had reacted. The acids recovered weighed 22.5 g. and had a saponification value of 241, indicating an equivalent weight of 233, and contained 2.8% by wt. of sulfur. With a similar experiment, the acids recovered had a saponification value of 323, indicating an equivalent weight of 173, and an indicated average molecular weight (cryoscopic) of 600. These acids contained 3.0% sulfur. The ratio of molecular weight to equivalent weight was 3.4, indicating a mixture containing acids with more than 2 acid groups per molecule.

Example III

The various recovered acids of application Serial No. 819,932 illustrated in Table III therein are further examples of polybasic acid starting materials for the present invention.

Example IV

The polybasic acids described in runs 12 to 47 inclusive and shown in Tables I, II, III, IV, VI and X in copending application Serial No. 79,661 are additional examples of acids that may be used in accordance with this invention.

The starting material for the reaction to prepare the polybasic acids may be any complex polynuclear, and/or heterocyclic aromatic hydrocarbon from synthetic or natural sources. Such starting materials include the combined reformate polymers and FCC recycle stock described in application Serial No. 79,661. A preferred and unique source of aromatic starting material comprises petroleum fractions rich in more complex polynuclear aromatic hydrocarbons, not only because the dibasic or polybasic acid products therefrom have unique properties, but also the techniques outlined herein are particularly adapted to processing these more complex and resistant source materials. Illustrating the preferred and novel starting materials is the class known as solvent extracts from the manufacture of mineral lubricating oils, which solvent extracts are rich in complex, polynuclear, aryl, alkaryl, condensed ring and heterocyclic nuclei (having molecular weights of about 300 to 750) forming the organic portion of the dibasic or polybasic carboxylic acids as part of the polyamides of this invention. Solvent extracts from the manufacture of bright stock and neutral lubricating oils are particular examples of such fractions rich in complex aromatic compounds obtained as by-products from the solvent refining of mineral oils. Since said copending application Serial No. 79,661 sets forth a complete description of the physical and chemical properties of these solvent extracts, no further explanation is necessary herein.

Without limiting the invention, the characteristics of the products of this invention are further disclosed as thus far evaluated. The novel polyamides of this invention are mixtures of amides of the dihydronaphthalene, dihydrophenanthrene, and dihydroanthracene types averaging in molecular weight from about 750 to 50,000 having several alkyl groups in each aromatic nucleus wherein the sum of the carbon atoms in the alkyl substituents varies between 15 to 22. Despite the size of the amide molecules the linkages through or between the carboxyl and the amine groups are about the same as those of amides of phthalic and terephthalic acids. A portion of the aromatic rings or condensed aromatic rings is probably further condensed with naphthenic rings to form configurations similar to the steroid ring system. Extract dibasic acids from solvent extracts obtained in the production of bright stocks and the corresponding polyamides probably contain more highly condensed aromatic structures. Most of the sulfur (1.7 to 3.2% or 4.5% total sulfur being present) is in the form of heterocyclic rings with carbon associated with both the aromatic type and naphthenic type structures present. Only trace amounts of the sulfur is present as high molecular weight aliphatic sulfides. The nitrogen content of distilled solvent extracts is 0.01 to 0.04%. Analysis for the types of carbon linkages as percent $C_a$ (carbon atoms in aromatic configuration) percent $C_n$ (carbon atoms in naphthenic configuration) and percent $C_p$ (carbon atoms in paraffinic configuration) gives results ranging from about 30–40% $C_a$, 20–35% $C_n$ and 31–47% $C_p$ using the method of Kurtz, King, Stout, Partikian and Skrabek (Anal., Chem. 28, 1928 (1956)). The polybasic acids used to prepare the polyamides of this invention have acid numbers (1948 Method) of about 150–450, M.P. 80–90° C., bromine No. 16–24, sulfur 1.7–2.3%, are deep red or red brown in color, transparent in thin sheets and contain 0–6% unsaponifiables. They are soluble in ethylether, acetone, MEK, tetrahydrofuran, benzene, toluene and xylene.

Although the acids to be used have been demonstrated by a number of examples, these are not to be construed as limiting. The term "solvent extracts" is used in its recognized meaning in the solvent extraction art. The term "extract dibasic acids" or "extract polycarboxylic acids" used herein shall be construed to include acids containing 2 or more carboxyl groups per molecule with the upper limit being about 7 carboxyl groups.

In order to illustrate the preparation of polyamides of the present invention, the following examples are given:

*Example V*

Three hundred g. of polybasic, polynuclear acids prepared in accordance with Example I, having an acid value (AOCS) of 172 and a saponification value of 189, and 35 g. of ethylene diamine are charged to a one-liter, three-neck flask equipped with a stirrer, thermometer, and water-trap reflux condenser. The mixture is heated under a nitrogen atmosphere, with stirring, to 240° F., the water of reaction being removed by means of the water trap in the reflux condenser. After about three hours, the reflux rate decreases and the pot temperature starts to rise. When the pot temperature reaches about 400° F., reflux practically ceases, evidencing substantial completion of reaction. The remaining traces of moisture and excess amine are removed by applying vacuum, and the hot, viscous, liquid resin is poured into a container or mold where is solidifies upon cooling. The solid resin is thermoplastic, somewhat brittle, and soluble in aromatic hydrocarbons. The polyamide resin product is suitable for use in protective coatings.

*Example VI*

The polybasic, polynuclear acids of Example I in an amount to provide a 0.1 molar excess are reacted with p-phenylene diamine as in Example V. The resulting resin is heated to about 600° F. at which temperature it begins to set within about 30 minutes. The partially thermoset resin is only slightly soluble in aromatic hydrocarbons, and is suitable for use in the manufacture of glass-fiber reinforced plastics. Further heating results in greater cross-linking and produces a plastic suitable for structural use.

*Example VII*

Three hundred gms. of the polybasic, polynuclear acids having an A.N. of 240, Br No. of 25, and percent S of 2.6% were treated with 48 gms. trimethylene diamine in the presence of 100 g. xylene. The reaction was essentially complete at 450° F. pot temperature as evidenced by cessation of water removal. The resultant resin was a hard slightly elastic material with a tensile strength of 96#/in.

*Example VIII*

The polybasic, polynuclear acids of Example VII are treated with N,N'-dimethyl phenylene diamine following the procedure of Example V. Reaction is essentially complete after one hour at a pot temperature of 450° F. The resultant resin has a tensile strength of about 200#/in. and remains solid at temperatures up to 400° F.

*Example IX*

Three hundred g. of solvent extract dibasic acids of Example VII were treated with 68 g. of diethylene triamine in 100 g. xylene. At 450° F. the reaction was essentially complete. The resultant dark amber resin had a tensile strength of 216 p.s.i.

*Example X*

310 gms. of the resin of Example IX is further reacted with 150 gms. of the dibasic acids of Example VII by heating to 600° F. for about one hour. A non-melting cross-linked polymer eminently suited for use in reinforced plastics is obtained. Solvent resistance and thermal stability are excellent.

*Example XI*

300 grams of dibasic acids obtained by the sodium metalation of extract, obtained by the phenol extraction of neutral lubricating oil, and subsequently carbonated and acidified and having the following properties: acid number—240, bromine number—25, percent sulfur—2.57, were mixed with 100 grams of xylene and heated in a kettle to 90° C. with agitation. As soon as all the acid had dissolved in the xylene, 96 grams of triethylenetetramine were slowly added dropwise, care being taken to maintain the rate of addition to prevent uncontrollable exothermic reaction. After the triethylenetetramine had been added, the temperature of the reaction mixture was raised to 218° C. The evolved water-xylene mixture was condensed by means of a water-cooled condenser and removed. When the evolution of water and xylene had ceased, heating was stopped and the reaction mixture was allowed to cool to room temperature. This first stage reaction mixture (the linear polyamide polymer) was hard and brittle and was easily pulverized by rubbing. The resulting resin is hard and somewhat brittle, having properties suitable for glass-fiber reinforced plastics, caulking compounds etc.

*Example XII*

300 grams of polybasic polynuclear acids having an acid number of 241, prepared from solvent extract No. 41, are reacted with a sufficient amount of tetraethylene pentamine to provide 0.5 equivalent of said acid per amino group, at 500° F. for 4 hours producing a cross-linked resin having structural properties.

As seen from the description, the invention is directed to polyamides derived from the reaction of polyfunctional amines with polybasic polynuclear aromatic acids derived from petroleum fractions rich in polynuclear aromatic nuclei. Linear polymers are formed with difunctional amines and cross-linked polymers with trifunctional amines. At temperatures of about 450° to 700° F. polyamides having valuable properties are obtained by reacting polyfunctional amines with 0.5 to 0.9 equivalent per amino group of the polybasic polynuclear aromatic acids derived from petroleum fractions. The use of 0.5 to 1.0 equivalent per primary amino group and 0 to 0.5 equivalent per secondary amino group of polyfunctional polybasic polynuclear acids is also contemplated. Cross linked or cross linkable thermosetting polyamides prepared by the reaction of petroleum base polynuclear polyaromatic polybasic acids with polyfunctional amines, particularly those containing three or more reactable amino groups wherein a stoichiometric deficiency of the carboxylic acid functions or a 10% to 30% molar excess of acid functions are employed, particularly at temperatures of 450° to 700° F. are also contemplated. In the latter instance, cross-linking occurs between the excess unreacted acid functions and the active hydrogen atoms on the amido groups.

It is obvious that modified polyamides may be prepared wherein 25–100 equivalent percent of the acids used may be polycarboxylic acids derived from petroleum fractions and 0–75 equivalent percent can be other known polyfunctional acids. Such modifications can be employed to vary the properties of the resulting polymers as is well known in the art.

The embodiments of the invention in which an exclusive property or privilege is claimed are defined as follows:

1. Linear polyamides prepared by the condensation of
   (1) a complex polynuclear aromatic carboxylic acid obtained by metalation of the solvent extract of mineral lubricating oil, said solvent being selective for aromatic compounds, to form the alkali metal adduct, carbonation of said adduct to form the corresponding alkali metal salt of the carboxylic acid and acidification of said salt to form the free carboxylic acid and
   (2) a polyfunctional amine having at least one hydrogen atom on each amino nitrogen and containing 2 to 70 carbon atoms.

2. Cross-linked polymers prepared by the condensation of
   (1) a complex polynuclear aromatic carboxylic acid obtained by metalation of the solvent extract of mineral lubricating oil, said solvent being selective for aromatic compounds, to form the alkali metal adduct, carbonation of said adduct to form the corresponding alkali metal salt of the carboxylic acid and acidification of said salt to form the free carboxylic acid characterized by being complex, polynuclear aromatic, alkyl-aromatic compounds predominating in carbon and hydrogen, containing about 1.7 to 4.5 weight percent of sulfur, having a molecular weight above about 300 and having about 1.7 to 3.5 average number of aromatic rings per aromatic molecule and (2) a polyfunctional amine having at least one hydrogen atom on each amino nitrogen and containing 2 to 70 carbon atoms to form a linear polyamide and reacting said polyamide with an additional amount of said complex acid to form a cross-linked polymer.

3. A polyamide resin prepared by the condensation of
(1) a complex polynuclear aromatic carboxylic acid obtained by metalation of the solvent extract of mineral lubricating oil, said solvent being selective for aromatic compounds, to form the alkali metal adduct, carbonation of said adduct to form the corresponding alkali metal salt of the carboxylic acid and acidification of said salt to form the free carboxylic acid characterized by being complex, polynuclear aromatic, alkyl-aromatic compounds predominating in carbon and hydrogen, containing about 1.7 to 4.5 weight percent of sulfur, having a molecular weight above about 300 and having about 1.7 to 3.5 average number of aromatic rings per aromatic molecule and
(2) ethylene diamine at a temperature of about 240° to 400° F.

4. A polyamide resin prepared by the condensation of
(1) a 0.1 molar excess of a complex polynuclear aromatic carboxylic acid obtained by metalation of the solvent extract of mineral lubricating oil, said solvent being selective for aromatic compounds, to form the corresponding alkali metal salt of the carboxylic acid and acidification of said salt to form the free carboxylic acid characterized by being complex, polynuclear aromatic, alkyl-aromatic compounds predominating in carbon and hydrogen, containing about 1.7 to 4.5 weight percent of sulfur, having a molecular weight above about 300 and having about 1.7 to 3.5 average number of aromatic rings per aromatic molecule
(2) and p-phenylene diamine at a temperature of about 600° F.

5. A polyamide resin prepared by the condensation of
(1) a complex polynuclear aromatic carboxylic acid obtained by metalation of the solvent extract of mineral lubricating oil, said solvent being selective for aromatic compounds, to form the alkali metal adduct, carbonation of said adduct to form the corresponding alkali metal salt of the carboxylic acid and acidification of said salt to form the free carboxylic acid characterized by being complex, polynuclear aromatic, alkyl-aromatic compounds predominating in carbon and hydrogen, containing about 1.7 to 4.5 weight percent of sulfur, having a molecular weight above about 300 and having about 1.7 to 3.5 average number of aromatic rings per aromatic molecule (2) and trimethylene diamine at a temperature about 450° F.

6. A polyamide resin prepared by the condensation of
(1) a complex polynuclear aromatic carboxylic acid obtained by metalation of the solvent extract of mineral lubricating oil, said solvent being selective for aromatic compounds, to form the alkali metal adduct, carbonation of said adduct to form the corresponding alkali metal salt of the carboxylic acid and acidification of said salt to form the free carboxylic acid characterized by being complex, polynuclear aromatic, alkyl-aromatic compounds predominating in carbon and hydrogen, containing about 1.7 to 4.5 weight percent of sulfur, having a molecular weight above about 300 and having about 1.7 to 3.5 average number of aromatic rings per aromatic molecule
(2) and N,N'-dimethylphenylene diamine at a temperature of about 450° F.

7. A polyamide resin prepared by the condensation of
(1) a complex polynuclear aromatic carboxylic acid obtained by metalation of the solvent extract of mineral lubricating oil, said solvent being selective for aromatic compounds, to form the alkali metal adduct, carbonation of said adduct to form the corresponding alkali metal salt of the carboxylic acid and acidification of said salt to form the free carboxylic acid characterized by being complex, polynuclear aromatic, alkyl-aromatic compounds predominating in carbon and hydrogen, containing about 1.7 to 4.5 weight percent of sulfur, having a molecular weight above about 300 and having about 1.7 to 3.5 average number of aromatic rings per aromatic molecule and
(2) diethylene triamine at a temperature of about 450° F.

8. A cross-linked polyamide prepared by the reaction of
(1) a complex polynuclear aromatic carboxylic acid obtained by metalation of the solvent extract of mineral lubricating oil, said solvent being selective for aromatic compounds, to form the alkali metal adduct, carbonation of said adduct to form the corresponding alkali metal salt of the carboxylic acid and acidification of said salt to form the free carboxylic acid characterized by being complex, polynuclear aromatic, alkyl-aromatic compounds predominating in carbon and hydrogen, containing about 1.7 to 4.5 weight percent of sulfur, having a molecular weight above about 300 and having about 1.7 to 3.5 average number of aromatic rings per aromatic molecule and
(2) diethylene triamine at a temperature of about 450° F. to form a polyamide and reacting said polyamide with an additional amount of said complex acid to form a cross-linked polymer.

References Cited in the file of this patent

UNITED STATES PATENTS

| | | |
|---|---|---|
| 2,174,619 | Carothers | Oct. 3, 1939 |
| 2,223,916 | Martin | Dec. 3, 1940 |
| 2,296,555 | Hurbert et al. | Sept. 22, 1942 |
| 2,625,536 | Kirby | Jan. 13, 1953 |
| 2,683,135 | Bloch | July 6, 1954 |
| 2,937,162 | Martin et al. | May 17, 1960 |
| 2,986,563 | Boekelheide et al. | May 30, 1961 |
| 3,005,743 | Louch et al. | Oct. 24, 1961 |

UNITED STATES PATENT OFFICE
CERTIFICATE OF CORRECTION

Patent No. 3,154,524                     October 27, 1964

Thomas W. Martinek

It is hereby certified that error appears in the above numbered patent requiring correction and that the said Letters Patent should read as corrected below.

Column 1, line 45, after "cycloparaffinic" insert a comma; line 46, after "atoms" insert a comma; same column 1, line 49, after "atoms" insert a comma; column 3, line 31, for "-isobutyphenylenediamine" read -- -isobutylphenylenediamine --; line 42, for "amnie" read -- amine --; same column 3, line 54, after "7" strike out the comma; column 4, line 2, for "spremidin" read -- spermidin --; column 7, line 21, for "is" read -- it --.

Signed and sealed this 16th day of March 1965.

(SEAL)
Attest:

ERNEST W. SWIDER                     EDWARD J. BRENNER
Attesting Officer                       Commissioner of Patents